Patented Aug. 9, 1949

2,478,879

UNITED STATES PATENT OFFICE 2,478,879

POROUS COMPOSITIONS

Walter T. L. Ten Broeck, Jr., Akron, Ohio, assignor to Wingfoot Corporation, Akron, Ohio, a corporation of Delaware No Drawing. Application February 23, 1946, Serial No. 649,735

5 Claims. (Cl. 260—2.5)

This invention relates to a new light-weight resinous composition and to methods for its preparation from thermoplastic vinyl chloride resins.

In the art of manufacturing artificial sponges the method of mixing and heating a plastic material with a substance which evolves a gas at elevated temperatures, is well known. This method, however, is limited in its use because the compositions must be resilient at the lower temperatures at which they are used (60–130° F.) and yet they must be sufficiently fluid at the elevated temperatures at which they are prepared (250–400° F.), usually called the "blowing temperature." Many resinous compositions which have the required properties at the lower temperatures of normal use are not sufficiently soft or fluid at the temperatures used to evolve the gases during fabrication. Polyvinyl chloride and the vinyl chloride copolymers are compounds having such unsuitable properties. Plasticizers, such as dibutyl sebacate and tricresyl phosphate, have been added to vinyl chloride polymers in order to increase the fluidity of the resins at the blowing temperature, but with little success, since the addition of sufficient plasticizer to achieve the desired result at blowing temperatures produces a soft flabby product at temperatures of normal use.

It is the primary purpose of this invention to produce from a polyvinyl chloride or a vinyl chloride copolymer, a sponge which is stiff and resilient at temperatures of normal use and which can be prepared by heating the resin to form a soft or viscous liquid composition at temperatures within which the plastic is stable to the effects of heat. A further purpose is to prepare a lightweight, porous resinous product of good compression resistance and elasticity, which product contains uniformly dispersed bubbles of a fixed gas.

In accordance with this invention artificial sponges may be prepared from vinyl chloride polymers, which expression is intended to include both polyvinyl chloride and copolymers of vinyl chloride and a compatible mono-olefinic monomer, especially the copolymers of more than 70 percent of vinyl chloride and less than 30 percent of other polymerizable mono-olefinic monomers compatible with said vinyl chloride. The said other mono-olefinic monomers may be vinyl esters of saturated fatty acids, such as vinyl acetate, vinyl propionate and vinyl butyrate, alkyl esters of acrylic acid and the alpha-alkyl- and alpha-halo-substituted acrylic acids, such as methyl methacrylate, ethyl acrylate, methyl chloroacrylate, and ethyl bromoacrylate, the allyl esters of saturated fatty acids, such as allyl acetate, allyl propionate and allyl butyrate, the dialkyl esters of butenedioic acid and of the corresponding halogen-substituted acids, such as ethyl fumarate, methyl maleate, ethyl chloro fumarate, and methyl bromomaleate, and the vinylidene halides such as unsymmetrical dichlor-ethylene, 1,1-dibromoethylene and 1-chloro-1-bromoethylene.

It has been found that the usually undesirable properties of vinyl chloride polymers do not interfere with either the manufacturing operations or with the ultimate physical properties of the sponge compositions if the polymers are blended with a proportion of a solid polyvinyl acetal. Suitable acetals capable of being used in the practice of this invention are polyvinyl formal, polyvinyl butyral, the specific compound polyvinyl acetal in which the R of the above structural formula is the ethylidene radical $$(CH_3-CH<)$$

and higher homologues thereof. The acetals are made by condensing aliphatic aldehydes with polyvinyl alcohol, or by hydrolyzing polyvinyl esters in the presence of an aldehyde. The acetals are well known compounds and are available commercially. They may be added in proportions varying from 5 to 40 percent by weight based on the vinyl chloride polymer. The blends of the vinyl chloride polymers and the polyvinyl acetals may be prepared on a roll mill, in a Banbury mixer, or by any other conventional rubber and plastic mixing device. If desired, the mixing operation may be conducted at an elevated temperature to achieve softer polymer mixtures. Other modifying agents may be added as described more fully below.

The blowing agents used in the practice of this invention are compounds, usually stable solids at room temperatures, which decompose when subjected to the elevated temperatures at which the sponges are blown. Although any compound which evolves a gas when heated to elevated temperatures may be used, the more desirable compounds are those which do not form residues upon decomposition which will interfere with subsequent operations or develop undesirable physical and chemical properties in the ultimate sponge composition. Generally, compositions which decompose to form odorless and non-toxic gases are preferred. Thus, blowing agents which decompose to form carbon dioxide or nitrogen are very valuable in the practice of this invention. In the preferred class of blowing agents are the bicarbonates of sodium, potassium, calcium, bismuth and other metals, metallic oxalates and formates, such as calcium oxalate, manganese oxalate and sodium formate, and diazo compounds, such as amino-diazo-benzene. Other useful blowing agents are the ammonium compounds, such as ammonium carbonate, ammonium bicarbonate, ammonium benzoate, ammonium nitrate and ammonium sulfite, the nitric and nitrous acid salts, such as calcium nitrate and barium nitrite, and various metallic carbamates. The blowing agent, or a mixture of two or more of said agents, is incorporated with the vinyl chloride polymer and the polyvinyl acetal by mixing simultaneously with the blending of the copolymer and the acetal, or it may be added subsequent to the blending operation. If the blending operation takes place at an elevated temperature it may be desirable to cool the blended resins prior to the addition of the blowing agent, this being especially true if the more readily decomposable blowing agents, such ammonium bicarbonate, are used. The quantity of blowing agent will determine the density of the ultimate sponge composition and the size and number of gas cells in the resin mass. Although generally any quantity of agent may be used, the compositions containing very few gas cells are not substantially different from the unblown compositions while the use of large quantities produces weak structures with more or less continuous gas interstices. The most desirable and valuable compositions are produced by using from 0.5 to 10 percent by weight based on the mixture of vinyl chloride polymer and acetal.

The sponge forming operations are conducted by inserting the vinyl chloride polymer, having compounded therewith the acetal and the gas-evolving solid, in a mold of the size and shape desired in the ultimate sponge product. The mold is then heated to a temperature at which the vinyl chloride polymer-polyvinyl acetal mixture is quite fluid and at which the blowing agent is unstable. The particles of blowing agent uniformly dispersed in the resin mixture decompose and evolve gases which produce uniform sized bubbles uniformly dispersed throughout the resin product. The temperatures required to effect the desirable result will vary to some extent, depending upon the softening point of the resin composition and the decomposition temperature of the blowing agent. Generally blowing temperatures of 250° to 400° F. are useful and in this range of temperature the acetal-vinyl chloride polymer mixtures are sufficiently soft to permit the evolution and expansion of the gases generated by the decomposition of a blowing agent mixed therein. The decomposition temperatures of many gas-producing compounds may be increased by slight pressures. Accordingly, some gas-evolving solids which ordinarily decompose at very low temperature, for example 35° C. to 50° C., are useful as blowing agents because when compounded with the resin mixtures the decomposition is restrained until the resin mixture is soft enough to permit the expansion of the evolved gases.

The blowing operations are most conveniently conducted in a mold or press which is provided with wall conduits for the circulation of steam and cooling water. Steam of pressure required to provide the desired blowing temperature is used to expand the composition and cold water is subsequently used to set the sponge composition and to expedite the cooling of the mold.

Generally, the residue from the blowing agent is basic in its chemical properties. This basicity may be objectionable by reason of increasing the water-absorption of the vinyl resin. Under such conditions it may be desirable to add solid acids, such as stearic acid, oleic acid, or other high molecular carboxylic acids to react with the free bases formed during the blowing operations.

The sponge compositions may be filled or mixed with solid compositions which strengthen, color, or otherwise modify the physical properties thereof. These compositions include calcium silicate, magnesia, calcium carbonate, talc, titanium dioxide or colored pigments, such as lead chromate or fibrous materials, such as asbestos, glass fiber, cotton floc or other vegetable fibers. Stiffening agents, such as finely divided glass, fuller's earth or diatomaceous silica and inert fillers, such as sawdust, cork or gypsum, may be added. If desired, fire-proofing compositions, such as chlorinated diphenyl, may be included to increase the temperature of combustion. Suitable dyes may also be added to produce any desired color in the porous vinyl composition.

Frequently it is desirable to add liquid plasticizers to the sponge compositions. The purpose of such addition is to modify the ultimate composition of the artificial sponges in the event that softer compositions are desired than would otherwise result from specified proportions of vinyl polymer and acetal. Any liquid composition capable of being blended with the vinyl resin and which has a sufficiently high boiling point to withstand without evaporation the usual temperatures encountered in use may be utilized. Dibutyl sebacate and tricresyl phosphate are typical examples of plasticizers although many others may be used.

A preferred modification of this invention involves the use of amines to prepare an improved sponge composition. It has been found that amines, particularly the higher boiling amines which will not evaporate and be driven out of the composition, can be incorporated simultaneously with the blowing agent, the vinyl chloride polymer and the acetal. Thus, upon heating to a temperature between 250° F. and 400° F. the blowing operation forms the gas cells and subsequently the amines cause a curing effect and a substantially insoluble infusible product of increased tensile strength is obtained. Although any amine may be used to achieve an improved product, those of higher molecular weight and lower volatility are preferred. In addition to amines, salts of amines which will decompose at the blowing temperature to yield the free amine are also useful. The use of the more volatile amines will require larger amounts thereof and a lower temperature of cure. The more desirable amines include primary amines, such as monohexadecyl amine, secondary amines, such as dibenzyl amine, tertiary amines, such as tributyl amine, hexamethylenetetramine, triamyl amine and diethanolamine, N - cyclic amines, such as morpholine, piperidine and piperazine, quaternary amines, such as tetramethyl ammonium hydroxide and triethyl benzyl ammonium hydroxide, salts of amines, such as hexamethylene - ammonium hexamethylenedithiocarbamate and piperidinium acetate, polyamines, such as m-phenylene diamine, di-3-amino-propyl ether, and N,N' bis(dicyclohexyl) dipropylene triamine, complex amines classifiable in more than one of the above classes, such as monomethyl propylene diamine, and the guanidines, such as diphenyl guanidine and di-orthotolyl guanidine. From 0.5 percent to 10 percent by weight of the various amines or derivatives thereof are mixed into the resin prior to the blowing operation.

The new compositions are light in weight and have good compression resistance and elasticity. They may be used as heat and sound proofing materials of construction, as padding under floor coverings and in boats and airplane structures, especially when good cold resistance is essential.

Further details of the practice of this invention are set forth in the following specific examples.

*Example 1*

A copolymer of 90 percent vinyl chloride and 10 percent diethyl chloromaleate was mixed on a roll mill with the following compounds, the proportions indicated being expressed as parts by weight based upon 100 parts by weight of the copolymer:

| | |
|---|---|
| Tricresyl phosphate | 100 |
| Polyvinyl butyral | 25 |
| Dibutyl sebacate | 20 |
| Calcium carbonate | 25 |
| Sodium bicarbonate | 18.75 |
| Stearic acid | 12.5 |

The mixture was prepared by adding the plasticizers to the softened copolymer, followed by the stearic acid. The polyvinyl butyral was then added and finally the sodium bicarbonate. After thoroughly blending the ingredients, the stock was sheeted and cut to convenient sizes for inserting in a mold 22 inches by 22 inches by 0.75 inch in size. The mold was provided with conduits in the side walls and piped for steam and cold water. The mold was heated with steam to 340° F., which temperature was maintained for 20 minutes. Cold water was then run through the mold for the purpose of cooling to facilitate handling and to set the thermoplastic sponge composition. The composition so obtained was resilient and had excellent compression resistance at room temperature.

*Example 2*

A copolymer of 90 percent vinyl chloride and 10 percent diethyl monochlorofumarate was thoroughly mixed with the following materials—the proportions indicated are parts by weight based upon 100 parts by weight of the copolymer:

| | |
|---|---|
| Tricresyl phosphate | 130 |
| Polyvinyl butyral | 30 |
| Calcium carbonate | 20 |
| Hexamethylenetetramine | 1.5 |
| Magnesium oxide | 5 |
| Sodium bicarbonate | 18.75 |
| Stearic acid | 12.5 |

The materials were mixed by softening the copolymer on a roll mill with the tricresyl phosphate. All of the other ingredients except the sodium bicarbonate were added and thoroughly mixed. The sodium bicarbonate was then added to complete the composition. Sheets of suitable size were then inserted in the mold described in the preceding example. After heating the mold to 330° F. and maintaining that temperature for 20 minutes the mold was cooled and a tough thermoset sponge composition was thereby obtained.

Although the invention is described with respect to specific embodiments thereof, it is not intended that the details thereof shall be construed as limitations upon the scope of the invention except to the extent incorporated in the following claims.

I claim:
1. A porous resinous product of good compression resistance and elasticity containing dispersed bubbles of a fixed gas, the product comprising a blend of (1) a copolymer of 90% by weight of vinyl chloride and 10% by weight of a dialkyl ester of a butenedioic acid and (2) 5 to 40% by weight based on the vinyl chloride copolymer of a polyvinyl acetal resin.

2. A porous resinous product of good compression resistance and elasticity containing dispersed bubbles of a fixed gas, the product comprising a blend of (1) a copolymer of 90% by weight of vinyl chloride and 10% by weight of diethyl fumarate and (2) 5 to 40% by weight based on the vinyl chloride copolymer of a polyvinyl acetal resin.

3. A porous resinous product of good compression resistance and elasticity containing dispersed bubbles of a fixed gas, the product comprising a blend of (1) a copolymer of 90% by weight of vinyl chloride and 10% by weight of diethyl maleate and (2) 5 to 40% by weight based on the vinyl chloride copolymer of a polyvinyl acetal resin.

4. A porous resinous product of good compression resistance and elasticity containing dispersed bubbles of a fixed gas, the product comprising a blend of (1) a copolymer of 90% by weight of vinyl chloride and 10% by weight of a dialkyl ester of a halo butenedioic acid and (2) 5 to 40% by weight based on the vinyl chloride copolymer of a polyvinyl acetal resin.

5. A porous resinous product of good compression resistance and elasticity containing dispersed bubbles of a fixed gas, the product resulting from blowing a mixture comprising (1) a copolymer resulting from the polymerization of a mixture comprising 90% vinyl chloride and 10% diethyl chloromaleate (2) 100 parts of tricresyl phosphate (3) 25 parts of polyvinyl butyral (4) 20 parts of dibutyl sebacate (5) 25 parts of calcium carbonate (6) 18.75 parts of sodium bicarbonate and (7) 12.5 parts of stearic acid, the parts being by weight and per 100 parts of the copolymer.

WALTER T. L. TEN BROECK, Jr.

REFERENCES CITED

The following references are of record in the file of this patent:

UNITED STATES PATENTS

| Number | Name | Date |
|---|---|---|
| 2,224,663 | Berg et al. | Dec. 10, 1940 |
| 2,374,078 | Coffman | Apr. 17, 1945 |
| 2,376,653 | Boyer | May 22, 1945 |
| 2,384,884 | Britton et al. | Sept. 18, 1945 |
| 2,386,995 | Wigal | Oct. 16, 1945 |
| 2,405,008 | Berry | July 30, 1946 |
| 2,416,874 | Howk et al. | Mar. 4, 1947 |

FOREIGN PATENTS

| Number | Country | Date |
|---|---|---|
| 429,316 | Great Britain | May 28, 1935 |

OTHER REFERENCES

Ellis: "The Chemistry of Synthetic Resins," vol. 2, page 1060; Reinhold Pub. Corp., New York, 1935.